Dec. 30, 1969   H. MEYER ET AL   3,486,235

INTERNAL MEASURING INSTRUMENT

Filed Nov. 29, 1967

INVENTORS

HANS MEYER
PAUL HILFIKER

BY

ATTORNEY

United States Patent Office 3,486,235
Patented Dec. 30, 1969

3,486,235
INTERNAL MEASURING INSTRUMENT
Hans Meyer, Renens, and Paul Hilfiker, Ecublens, Switzerland, assignors to Hans Meyer, Renens, Vaud, Switzerland
Filed Nov. 29, 1967, Ser. No. 686,464
Claims priority, application Switzerland, Dec. 21, 1966, 18,390/66
Int. Cl. G01b 5/12
U.S. Cl. 33—143
2 Claims

ABSTRACT OF THE DISCLOSURE

An internal measuring instrument wherein the wear of the parts is reduced by providing the conventional feelers urged outwardly by a forwardly progressing control member with a blade-shaped part on the feelers permanently engaging said control member along a line coplanar with the axis of the latter; said sharp edge is formed advantageously on a blade fitted in a longitudinal groove formed along the inner edge of the feeler.

Internal measuring instruments are already known, wherein the feelers are controlled by a rotary conical member. At the same time, the feelers are generally provided at their inner ends with surfaces lying in contact with a generating line of said control member. Said linear contact is obtained however only as long as the instrument is still practically new, since protracted use causes the feelers to wear with time and this leads to a contact along a surface. The wear is due primarily to the fact that foreign particles enter between the conical control member and the feeler as furthered by the shape of the contacting area, so that said foreign particles engage the surface of the feeler which is thus abraded and deformed.

Generally, said deformation assumes the shape of a hollow surface matching the conical surface of the control member. If the contact is obtained chiefly near the pointed end of the conical control member, the radius of said hollow surface formed on the feeler is correspondingly small. Now, if the measurement is made in such a case in registry with the truncated end of the conical member, the worn surface matches no longer the cone at such a point and substantial errors may appear then under certain circumstances.

The invention has for its object to remove such drawbacks and it covers an internal measuring instrument provided with a rotary control member and at least one feeler engaging the latter. According to the invention, said feeler is constituted, in registry with its line of contact with the control member by the edge of a blade lying in the same plane as the axis of the control member. Such an arrangement is such that, upon rotation of the control member, no foreign particles can any longer engage a gap between the feeler and the control member and, in contradistinction, they are urged away by the edge of said blade. The blade edge is thus worn at a much slower rate than in the case of feelers showing contact surfaces, so that the life of the instrument is thus much longer.

Furthermore, by reason of the reduced thickness of the blade, it is no longer possible for it to wear in the manner referred to hereinabove and consequently the systematic measuring error inherent to the instrument cannot increase during its life as is the case for instruments with contact surfaces as referred to hereinabove.

The novel arrangement leads therefore not only to a substantially longer life for the measuring instrument, but it is furthermore possible to retain throughout its use its original accuracy of measurement.

The accompanying drawings illustrate diagrammatically the operation of the invention. In said drawings.

Figure 1:
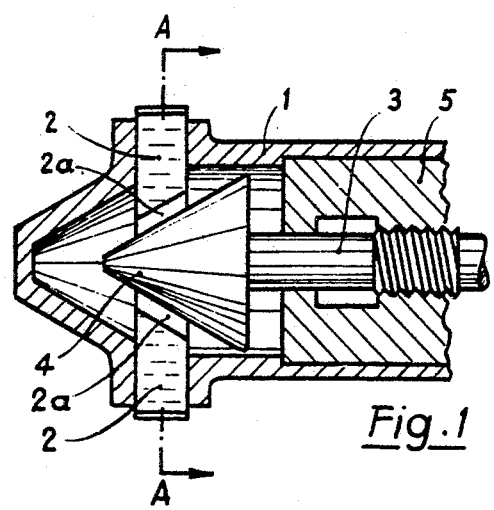
FIG. 1 is a longitudinal cross-section through the front section of an internal measuring instrument.
Figure 2:
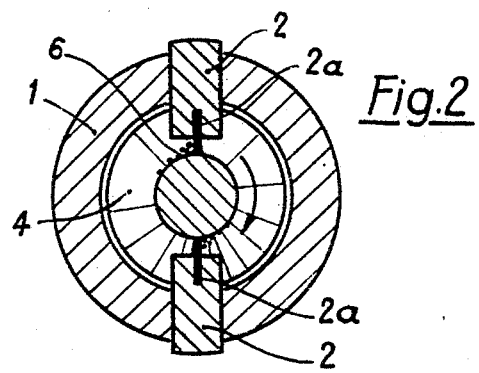
FIG. 2 is a cross-section through said instrument along line A—A of FIG. 1.

The drawings illustrate diagrammatically an internal measuring instrument including a body 1 inside which two measuring feelers 2 are adapted to move radially. The control member is constituted by a core 4 carried by a threaded spindle 3. Since said spindle 3 is carried in a tapped carrier 5 rigid with the body 1, said spindle progresses longitudinally upon rotation so as to make the cone 4 shift radially the feelers 2. The latter, which are shown as prism-shaped, carry at their inner ends sharp-edged blades 2a lying in the same plane as the axis of the spindle 3 and engaging the surface of the control member or cone 4 carried by said spindle. Said blades may either form part of the feeler or else, as illustrated in FIG. 2, they may form separate parts inserted in the feelers so as to be rigidly carried thereby. This last arrangement is advantageous inasmuch as the blades may be made of a material different from that forming the feelers and are thus easier to execute and these two features make the execution of the instrument cheaper.

Upon rotation of the spindle 3 (FIG. 2), in the direction of the arrow, it is apparent that any foreign particles such as 6 are urged away by the blades 2a and cannot engage between the blades and the cone 4. A premature wear is thus efficiently prevented. At the same time, the reduced thickness of the blade 2a provides the advantage that no possible wear can lead to any additional error in the measurement. The possibility of error is all the less when the blades are thinner. Practical experiments show that thicknesses of the blades of a few tenths of a millimeter have led to favorable results, for instance in the case of measuring instruments the range of measurement of which extends between 10 and 100 millimeters.

We claim:

1. An internal measuring instrument comprising a support, control means concurrently rotatable and axially displaceable during the measuring process and including a conical control member, at least one feeler carried by the support, said feeler adapted to be shifted radially thereof as said conical control member is rotated and axiable displaced, a blade-shaped part on said feeler having a contact face constantly engaging said conical control member during its axial progression, said blade-shaped part having outside faces forming approximately right angles to said blade-shaped part contact face and said conical control member, the distance between said outside faces being sufficiently small to define substantially line contact along a line coplanar with the center axis of said conical control member.

2. An internal measuring instrument according to claim 1, wherein said feeler has a longitudinal groove along its inner edge and said blade-shaped part is fitted in said groove.

References Cited

UNITED STATES PATENTS

| | | |
|---|---|---|
| 2,361,336 | 10/1944 | Volis. |
| 2,478,427 | 8/1949 | Schmid. |
| 2,591,452 | 4/1952 | Maag. |
| 2,881,529 | 4/1959 | Roch. |
| 3,188,744 | 6/1965 | Bowers et al. |

SAMUEL S. MATTHEWS, Primary Examiner